United States Patent [19]

Kodama et al.

[11] Patent Number: 5,764,419
[45] Date of Patent: Jun. 9, 1998

[54] TELECENTRIC ZOOM LENS

[75] Inventors: Naoko Kodama, Kawasaki; Masayuki Aoki, Oyama, both of Japan

[73] Assignee: Nikon Corporation, Tokyo, Japan

[21] Appl. No.: 608,429

[22] Filed: Feb. 28, 1996

[30] Foreign Application Priority Data

Mar. 2, 1995 [JP] Japan .................... 7-068630

[51] Int. Cl.⁶ .................... G02B 15/14; G02B 13/22
[52] U.S. Cl. .................... 359/676; 359/663; 359/683
[58] Field of Search .................... 359/663, 676, 359/681, 682, 686, 687, 649, 650, 685, 683

[56] References Cited

U.S. PATENT DOCUMENTS

| | | | |
|---|---|---|---|
| 4,572,620 | 2/1986 | Kikuchi | 359/708 |
| 4,591,244 | 5/1986 | Aono et al. | 359/688 |
| 4,618,219 | 10/1986 | Sugiura et al. | 359/688 |
| 4,637,690 | 1/1987 | Miyamae et al. | 359/683 |
| 5,054,898 | 10/1991 | Kitagishi et al. | 359/683 |
| 5,095,387 | 3/1992 | Horiuchi | 359/683 |

*Primary Examiner*—Daivd C. Nelms
*Assistant Examiner*—Jordan M. Schwartz
*Attorney, Agent, or Firm*—Klarquist Sparkman Campbell Leigh & Whinston, LLP

[57] ABSTRACT

A telecentric zoom lens is disclosed that comprises, in order from the magnifying side to the reducing side on an optical axis: first, second, third, fourth, and fifth lens groups having a positive, negative, negative, positive, and positive focal length, respectively. An open aperture is axially disposed between the third and fourth lens groups at the magnifying-side focal position of the combined fourth and fifth lens groups. When zooming from the maximum wide-angle state to the maximum telephoto state, the first, fourth, and fifth lens groups are stationary, while the second lens group axially moves linearly toward the reducing side and the third lens group axially moves along a convex path toward the magnifying side.

22 Claims, 12 Drawing Sheets

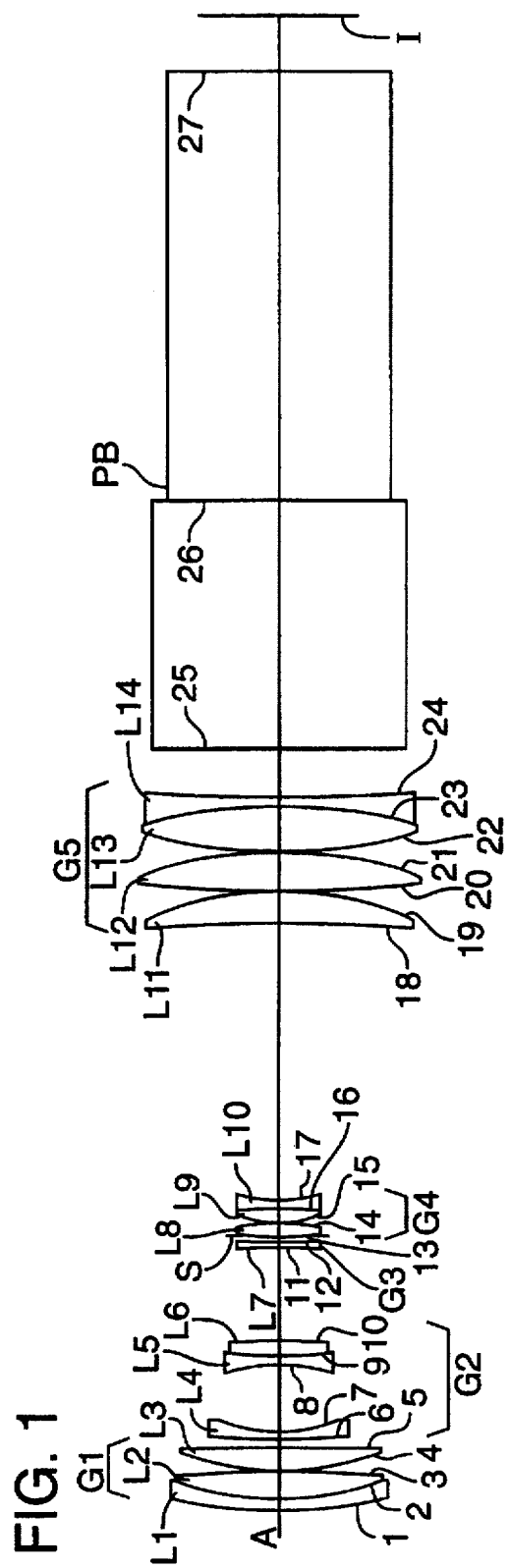

NA=0.10

0.500
SPHERICAL ABERRATION

Y=31.75

0.500
ASTIGMATISM

Y=31.75

5.000 (%)
DISTORTION

NA=0.10

0.500
SPHERICAL ABERRATION

Y=31.75

0.500
ASTIGMATISM

Y=31.75

5.000 (%)
DISTORTION

NA=0.11

0.500
SPHERICAL ABERRATION

Y=31.75

0.500
ASTIGMATISM

Y=31.75

5.000 (%)
DISTORTION

NA=0.11

0.500
SPHERICAL ABERRATION

Y=31.75

0.500
ASTIGMATISM

Y=31.75

5.000 (%)
DISTORTION

NA=0.10

0.500
SPHERICAL ABERRATION

Y=31.75

0.500
ASTIGMATISM

Y=31.75

5.000 (%)
DISTORTION

NA=0.10

0.500
SPHERICAL ABERRATION

Y=31.75

0.500
ASTIGMATISM

Y=31.75

5.000 (%)
DISTORTION

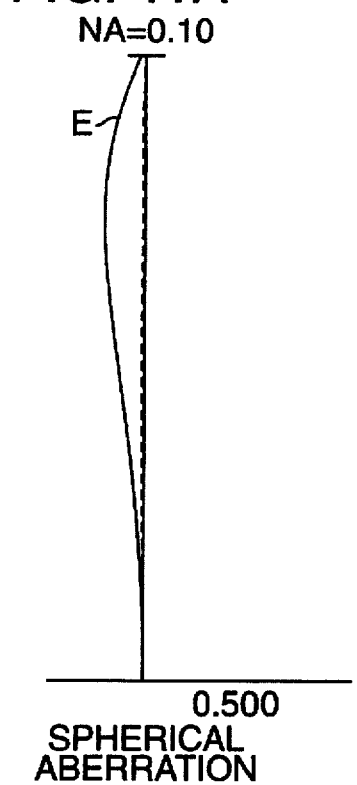
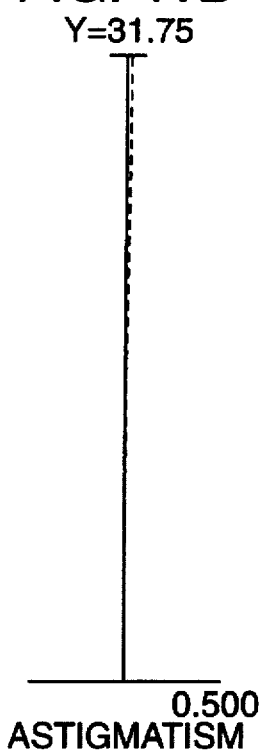
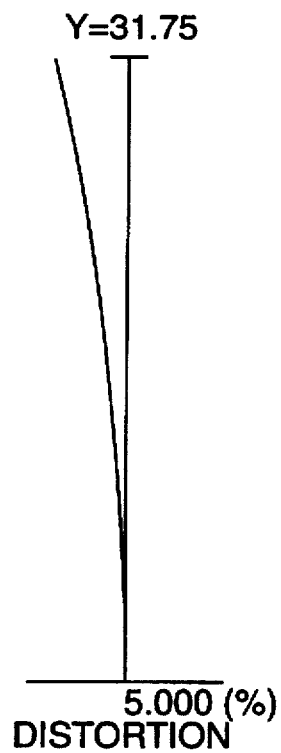
FIG. 11A
NA=0.10
FIG. 11B
Y=31.75
FIG. 11C
Y=31.75
0.500
SPHERICAL ABERRATION
0.500
ASTIGMATISM
5.000 (%)
DISTORTION
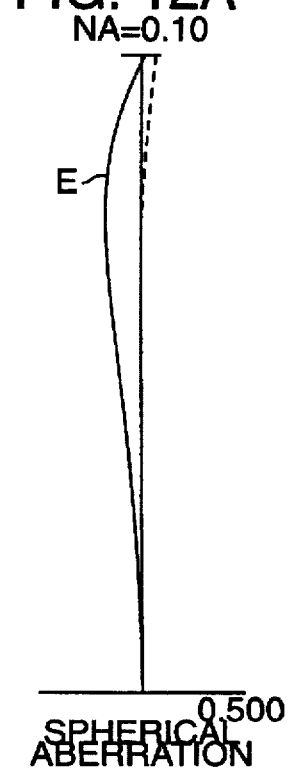
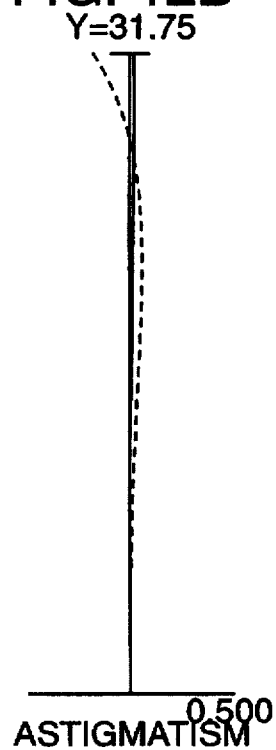
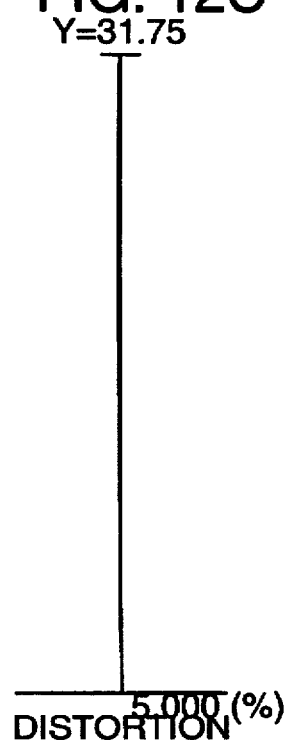
FIG. 12A
NA=0.10
FIG. 12B
Y=31.75
FIG. 12C
Y=31.75
0.500
SPHERICAL ABERRATION
0.500
ASTIGMATISM
5.000 (%)
DISTORTION

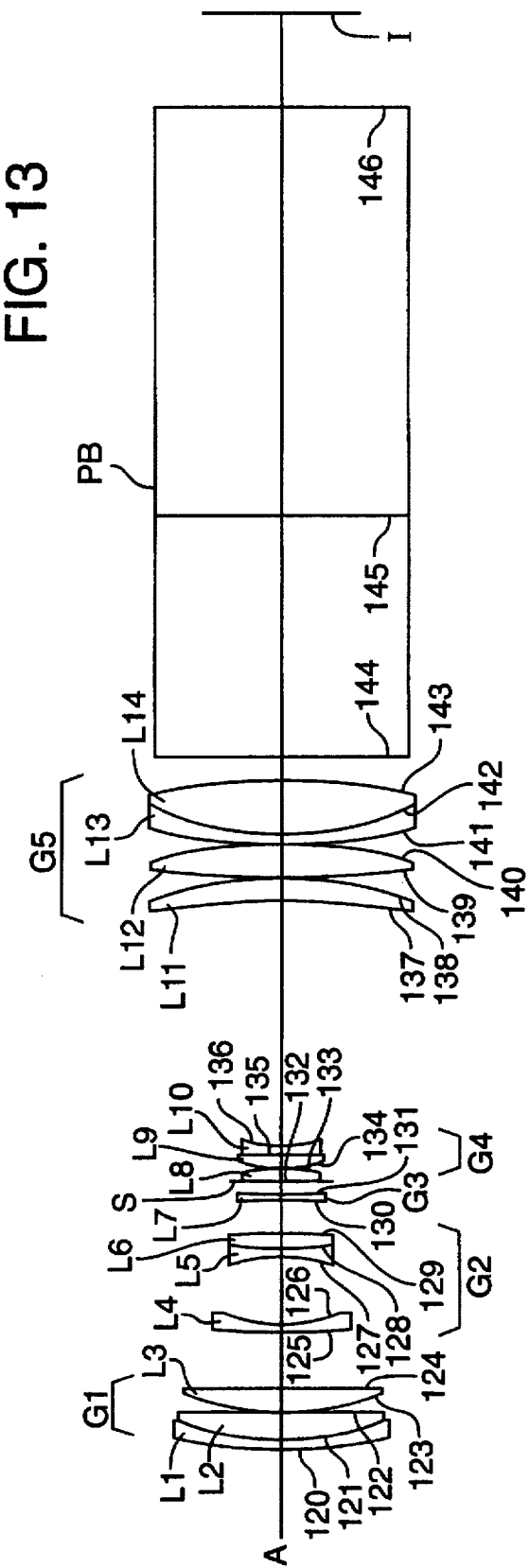

NA=0.10

0.500
SPHERICAL
ABERRATION

Y=31.75

0.500
ASTIGMATISM

Y=31.75

5.000 (%)
DISTORTION

NA=0.10

0.500
SPHERICAL
ABERRATION

Y=31.75

0.500
ASTIGMATISM

Y=31.75

5.000 (%)
DISTORTION

NA=0.10

SPHERICAL
ABERRATION
0.500

Y=31.75

ASTIGMATISM
0.500

Y=31.75

DISTORTION
5.000 (%)

NA=0.10

SPHERICAL
ABERRATION
0.500

Y=31.75

ASTIGMATISM
0.500

Y=31.75

DISTORTION
5.000 (%)

TELECENTRIC ZOOM LENS

FIELD OF THE INVENTION

This invention pertains to a telecentric zoom (i.e. variable focal length) lens; particularly such a lens usable in a projection optical apparatus utilizing one or more of a cathode-ray tube (CRT) or spatial light modulator (SLM) as a source of an image to be projected.

BACKGROUND OF THE INVENTION

Previously, in television projectors or LCD (liquid Crystal Display) projectors that projected an image onto a screen, light fluxes from three independent color screen images corresponding to red (R), green (G), and blue (B), each generated on a separate individual CRT or LCD, were projected onto the screen by respective individual projection lenses. The three color images would then be superposedly overlaid on the viewing screen to create a full-color image. As a result of having to use three separate projection lenses, costs are high, much space is required to accommodate the projection optics, and it is extremely difficult to align the R, G, and B images on the screen.

More recently, apparatus have come into use in which the light fluxes from the R, G and B screen images are first integrated using a dichroic mirror or dichroic prism; then, the integrated light flux is projected onto the screen using a single projection lens. Unfortunately, when such integrated light fluxes are projected onto the screen by a single lens, the lens must be telecentric on the CRT side (i.e., the reducing side) in order to prevent chromatic shift, and an extremely long back-focus is required to accommodate the prisms and/or mirrors between the CRT (or LCD, etc.) and the lens. In addition, the focal length of the lens should be variable over a desired range in order to project the screen image at any magnification onto a screen of a practical size. Conventional projection-lens technology has simply not kept pace with such needs.

SUMMARY OF THE INVENTION

An object of the present invention is to provide a telecentric zoom lens particularly suitable for CRT and LCD projection applications, wherein the lens possesses a suitably long back focus, excellent telecentricity, and a focal length that is variable over a desired range.

According to a preferred embodiment of the present invention, a telecentric zoom lens is provided having a focal length that can adjustably range from a maximum wide-angle state to a maximum telephoto state for the lens. Beginning in order from the "magnifying side" or "front side" (i.e., the side closest to the screen) and proceeding to the "reducing side" or "rear side" (i.e., the side closest to the CRT or LCD), the zoom lens comprises a first lens group having a positive focal length, a second lens group having a negative focal length, a third lens group having a negative focal length, a fourth lens group having a positive focal length, and a fifth lens group having a positive focal length. When the zoom lens is zoomed from its maximal wide-angle state to its maximal telephoto state, the second lens group moves axially in a linear fashion toward the reducing side and the third lens group axially moves along a convex path (toward the magnifying side) toward the magnifying side. The fourth lens group and fifth lens group are telecentric on the reducing side across the entire zoom range of the lens.

Further with respect to a preferred embodiment, the following conditions are satisfied:

$$0.5 < D4/f45 < 1.0$$

$$1.0 < f4/f5 < 1.7$$

wherein f4 is the focal length of the fourth lens group, f5 is the focal length of the fifth lens group, f45 is the composite focal length of the fourth and fifth lens groups, and D4 is the length of an axial space situated between the fourth and fifth lens groups.

Additional purposes, characteristics and benefits of this invention shall become clear in the following description, referring to the attached figures.

BRIEF DESCRIPTION OF THE DRAWINGS

FIG. 1 is an optical diagram showing both general aspects of a zoom lens according to the present invention as well as specific aspects of Example Embodiment 1.

FIG. 11 shows various aberration graphs for Example Embodiment 4 at its maximum wide-angle state; specifically, FIG. 11A pertains to spherical aberration, FIG. 11B pertains to astigmatism, and FIG. 11C pertains to distortion.

FIG. 12 shows various aberration graphs for Example Embodiment 4 at its maximum telephoto state; specifically, FIG. 12A pertains to spherical aberration, FIG. 12B pertains to astigmatism, and FIG. 12C pertains to distortion.

FIG. 13 is an optical diagram of Example Embodiment 5.

DETAILED DESCRIPTION OF PREFERRED EMBODIMENTS

Figure 2A:
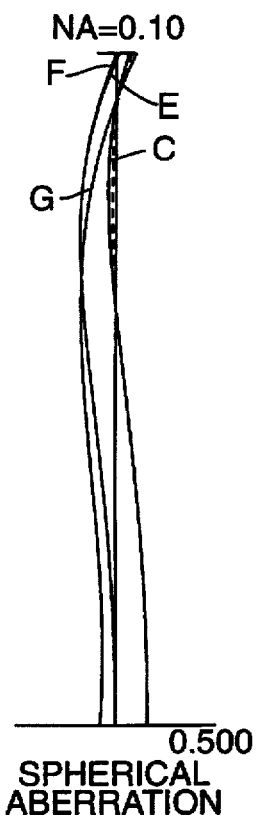
FIG. 2 shows various aberration graphs for Example Embodiment 1 at its maximum wide-angle state; specifically, FIG. 2A pertains to spherical aberration, FIG. 2B pertains to astigmatism, and FIG. 2C pertains to distortion.

A "positive" distance or direction along an optical axis extends from left to right in an optical diagram; a "negative" distance or direction extends from right to left.

The "curvature radius" of an optical surface (such as a surface of a lens element) is "positive" whenever the center of curvature lies to the right of the surface, and "negative" whenever the center of curvature lies to the left of the surface.

An "interfacial distance" is the distance, along an optical axis, between adjacent optical surfaces on separate lens elements.

A "principal point" is a point of intersection of the optical axis and a principal plane. The principal plane location is determined by first tracing paraxial rays through a lens element (or collection of lens elements) from the front (or rear) focal point, and then linearly extending the rays forward and backward from the first lens surface and the last lens surface, respectively, and noting where the rays intersect.

General aspects of a telecentric zoom lens according to the present invention are shown in FIG. 1, depicting optical components arranged along an optical axis. Beginning in order from the "magnifying side" or "front side" (i.e., the left side in the figure) and proceeding to the "reducing side" or "rear side" (i.e., the right side in the figure), the zoom lens comprises a first lens group G1 having a positive focal length, a second lens group G2 having a negative focal length, a third lens group G3 having a negative focal length, a fourth lens group G4 having a positive focal length, and a fifth lens group G5 having a positive focal length. The zoom lens is operable to zoom from a "maximum wide-angle state" (i.e., condition of shortest overall focal length of the lens) to a "maximum telephoto state" (i.e., condition of longest overall focal length of the lens) by moving the second lens group G2 in a linear fashion toward the reducing side and by moving the third lens group G3 along a convex path (toward the magnifying side).

The zoom lens according to the present invention preferably includes an opening aperture S disposed at the focal position on the magnifying side (i.e., front side) of the combined fourth and fifth lens groups. With such a configuration, the reducing side of the fourth lens group G4 and the fifth lens group G5 telecentric along the entire zoom range of the lens from the maximum wide-angle state to the maximum telephoto state.

In a telecentric zoom lens according to the present invention, the following Conditional Expressions (1) and (2) are preferably fulfilled:

$$0.5 < D4/f45 < 1.0 \quad (1)$$

$$1.0 < f4/f5 < 1.7 \quad (2)$$

wherein D4 is the length of the axial space situated between the fourth lens group G4 and the fifth lens group G5; f45 is the composite focal length of the fourth and fifth lens groups; f4 is the focal length of the fourth lens group; and f5 is the focal length of the fifth lens group.

Conditional Expression (1) pertains to obtaining good telecentricity, and specifies an optimum range for the ratio of D4/f45. In other words, maintaining D4/f45 between the upper and lower limits in Conditional Expression (1) makes it possible to place the aperture S at the composite focal position on the magnifying side of the fourth lens group G4, which facilitates excellent telecentricity.

Conditional Expression (2) pertains to obtaining a sufficiently long back focus of the zoom lens and to obtaining an excellent screen image. Conditional Expression (2) specifies an optimum range for f4/f5. Exceeding the upper limit in Conditional Expression (2) makes it impossible to maintain a desired back focus. The smaller the value of f4/f5, the more possible it is to obtain a sufficiently long back focus. However, if f4/f5 should fall below the lower limit in Conditional Expression (2), spherical aberration and distortion become unacceptably large, making it impossible to obtain a good screen image.

It is also preferable, in a telecentric zoom lens according to the present invention, that the following Conditional Expression (3) be fulfilled:

$$1.5 < Zm \quad (3)$$

wherein Zm is the zoom ratio of the zoom lens.

Conditional Expression (3) specifies a zoom ratio necessary whenever a telecentric zoom lens according to the present invention is to be used in a projection optical system that uses, for example, a CRT or liquid crystal display. Specifically, in a projection optical system employing a CRT or liquid crystal display, a zoom ratio greater than 1.5 is necessary due to the relationship between the screen and the projection distance.

Moreover, it is preferable in a telecentric zoom lens according to the present invention for the following Conditional Expression (4) to be fulfilled:

$$0.4 < |f2|/fw < 0.7 \quad (4)$$

wherein f2 is the focal length of the second lens group G2; and fw is the overall focal length of the zoom lens at the maximum wide-angle state.

Conditional Expression (4) allows for minimizing the amount of movement of the second lens group G2, which is the variator, during zooming and specifies an optimal range for |f2|/fw. Exceeding the upper limit in Conditional Expression (4) excessively weakens the refractive power of the second lens group G2; this causes the amount of axial movement of G2 required for achieving magnification changes to be too large. Falling below the lower limit of Conditional Expression (4) causes the amount of axial movement of G2 required for achieving magnification changes to be too small relative to the refractive power of the second lens group G2, thus making it difficult to correct aberrations, especially spherical aberration and distortion.

As shown in FIG. 1, the second lens group G2 preferably comprises a front lens subgroup and a rear lens subgroup that are axially separated from each other by a space. The front and rear subgroups preferably fulfill the following Conditional Expression (5):

$$-1 < D2/f2 < -0.2 \quad (5)$$

wherein D2 is the distance between the front subgroup and the rear subgroup; and f2 is the focal length of the second lens group G2. Exceeding the upper limit in Conditional Expression (5) causes the space between the front and rear subgroups of G2 to become too small, making it difficult to correct aberrations, particularly image surface distortion, over the entire zooming range from the maximum wide-angle state to the maximum telephoto state. Falling below the lower limit in Conditional Expression (5) causes the length of the second lens group to become too long, thereby making the overall size of the zoom lens disadvantageously large. Exceeding the lower limit can also make it difficult to ensure an adequate amount of axial movement of the second lens group G2 required for zooming purposes.

It will be appreciated that the present invention encompasses not only telecentric zoom lenses as described generally above, but also any of various lens systems and projection apparatus incorporating the zoom lens. A representative lens system within the scope of the present invention is a combination of a telecentric zoom lens and a color-integrating optical component axially disposed on the reducing side of the zoom lens, the color-integrating optical component being, for example, a prism block or filter array. A representative projection apparatus would include the telecentric zoom lens, an image source (such as a CRT or LCD) disposed on the reducing side of the zoom lens, and a viewing screen disposed on the magnification side of the zoom lens.

Example Embodiment 1

Example Embodiment 1, shown specifically in FIG. 1, comprises, in order from the magnifying side, a first lens group G1, a second lens group G2, a third lens group G3, a fourth lens group G4, and a fifth lens group G5. The first lens group G1 comprises a composite lens consisting of a negative meniscus lens element L1 having a convex surface 1 oriented toward the magnifying side, a biconvex lens element L2, and a positive meniscus lens element L3 having a convex surface 4 oriented toward the magnifying side. The second lens group G2 comprises a negative meniscus lens element L4 having a convex surface 6 oriented toward the magnifying side, and a composite lens consisting of a biconcave lens element L5 and a biconvex lens element L6. The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises a positive meniscus lens element L11 having a concave surface 18 oriented toward the magnifying side, a biconvex lens element L12, and a composite lens consisting of a biconvex lens element L13 and a biconcave lens element L14.

In FIG. 1, the Example Embodiment 1 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 1 also depicts a prism block PB that functions as a color-integration prism. The prism block PB is disposed on the reducing side of the fifth lens group G5. The prism block PB can be replaced with any of various other optical components performing a similar color-integrating function, such as parallel-plate filters.

Data pertaining to Example Embodiment 1 are listed in Table 1, below. In Table 1, f represents the overall focal length and Bf represents the back-focus of the zoom lens. Surface numbers progress sequentially in order from the magnifying side. Data for refractive index and Abbe's number are each indicated relative to the d-line ($\lambda$=587.6 nm).

Since a color-integrating prism block or any of various types of parallel plates and/or filters for color-integrating purposes can be situated between the surface 24 of the lens element L14 closest to the reducing side and the actual image plane I (i.e., plane of CRT, LCD, etc.), numerical values for parallel surfaces 25, 26, and 27 are included in Table 1.

TABLE 1

| Focal length (f) = 106 to 214 mm | | | | |
|---|---|---|---|---|
| Surface No. | Curvature Radius (mm) | Interfacial Distance (mm) | Refractive Index | Abbe's Number |
| 1 | 202.604 | 4.0 | 1.80518 | 25.44 |
| 2 | 114.600 | 12.5 | 1.5168 | 64.11 |
| 3 | −1845.349 | 0.2 | | |
| 4 | 101.182 | 11.0 | 1.5168 | 64.11 |
| 5 | 1191.436 | d5 | | |
| 6 | 358.778 | 3.0 | 1.7725 | 49.64 |
| 7 | 59.052 | 30.0 | | |
| 8 | −76.082 | 3.0 | 1.5891 | 61.17 |
| 9 | 83.466 | 7.0 | 1.80518 | 25.44 |
| 10 | −16832.776 | d10 | | |
| 11 | −139.625 | 2.0 | 1.5168 | 64.11 |
| 12 | 466.177 | d12 | | |
| 13 | 215.180 | 5.0 | 1.6477 | 33.&3 |
| 14 | −110.333 | 0.2 | | |
| 15 | 40.690 | 7.0 | 1.5407 | 47.22 |
| 16 | −290.060 | 3.2 | 1.8061 | 40.93 |
| 17 | 44.492 | d17 | | |
| 18 | −1191.860 | 14.0 | 1.4970 | 81.60 |
| 19 | −130.847 | 0.2 | | |
| 20 | 555.052 | 16.0 | 1.4970 | 81.60 |
| 21 | −177.528 | 0.3 | | |
| 22 | 197.911 | 20.0 | 1.4970 | 81.60 |
| 23 | −197.898 | 4.0 | 1.7569 | 31.69 |
| 24 | 554.833 | 20.9 | | |
| 25 | ∞ | 110.0 | 1.5168 | 64.11 |
| 26 | ∞ | 185.0 | 1.5152 | 35.29 |
| 27 | ∞ | Bf | | |

| Variable distances during magnification change: | | |
|---|---|---|
| Variable | f = 106.00 mm | f = 214.00 mm |
| d5 | 3.43 mm | 42.94 mm |
| d10 | 40.92 mm | 2.78 mm |
| d12 | 3.30 mm | 1.93 mm |
| d17 | 122.30 mm | 122.30 mm |
| Bf | 23.816 mm | 23.816 mm |

| Conditional Values: |
|---|
| (1) D4/f45 = 0.79 |
| (2) f4/f5 = 1.24 |
| (3) Zm = 2 |
| (4) |f2|/fw = 0.54 |
| (5) D2/f2 = −0.526 |

Note: Object (screen) distance D0 = 10 m is the standard position.

Figure 2B:
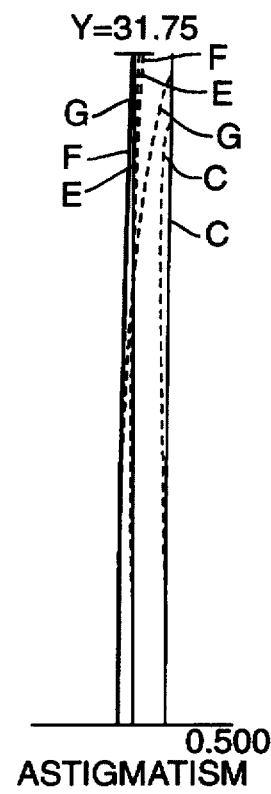
Figure 2C:
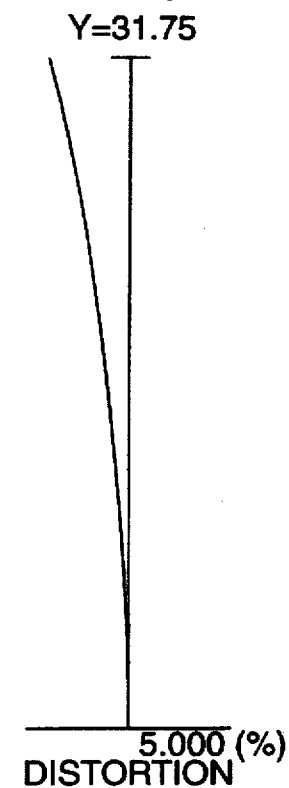
Figure 3A:
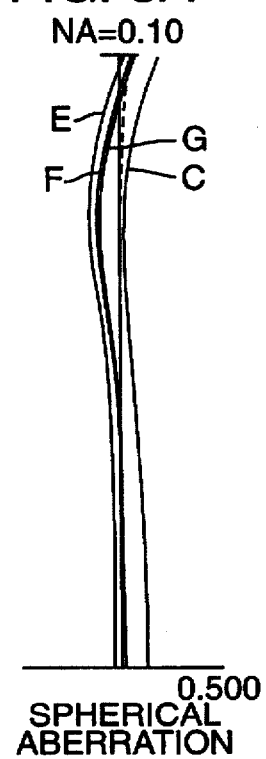
FIG. 3 shows various aberration graphs for Example Embodiment 1 at its maximum telephoto state; specifically, FIG. 3A pertains to spherical aberration, FIG. 3B pertains to astigmatism, and FIG. 3C pertains to distortion.
Figure 3B:
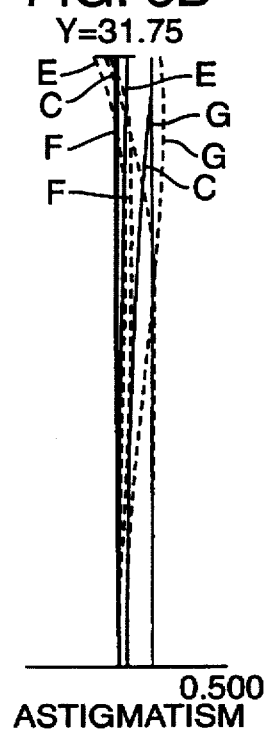
Figure 3C:
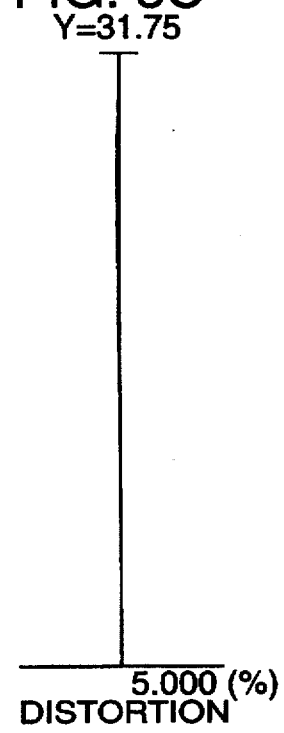

FIG. 2 and FIG. 3 present aberration graphs for Example Embodiment 1 at the maximum wide-angle state (FIG. 2) and the maximum telephoto state (FIG. 3). Specifically, FIGS. 2A and 3A are of spherical aberration, FIGS. 2B and 3B are of astigmatism, and FIGS. 2C and 3C are of distortion.

In FIGS. 2 and 3, NA is the numerical aperture number, Y is the image height, F is the F-line ($\lambda$=468.1 nm), G is the g-line ($\lambda$=435.8 nm), C is the c-line ($\lambda$=656.3 nm) and E is the e-line ($\lambda$=546.1 nm).

In addition, in FIGS. 2B and 3B, solid lines represent sagittal image surfaces and dotted lines represent meridional image surfaces. In FIGS. 2A and 3A, the dotted lines represent sine conditions.

As is clear from FIGS. 2 and 3, the various aberrations are well corrected in Example Embodiment 1, at least at the focal-length extremes of the zooming range. In this Example Embodiment, the back focus (Bf=238.96 mm; e-line) is maintained as the spatial back-focus.

Example Embodiment 2

Figure 4:
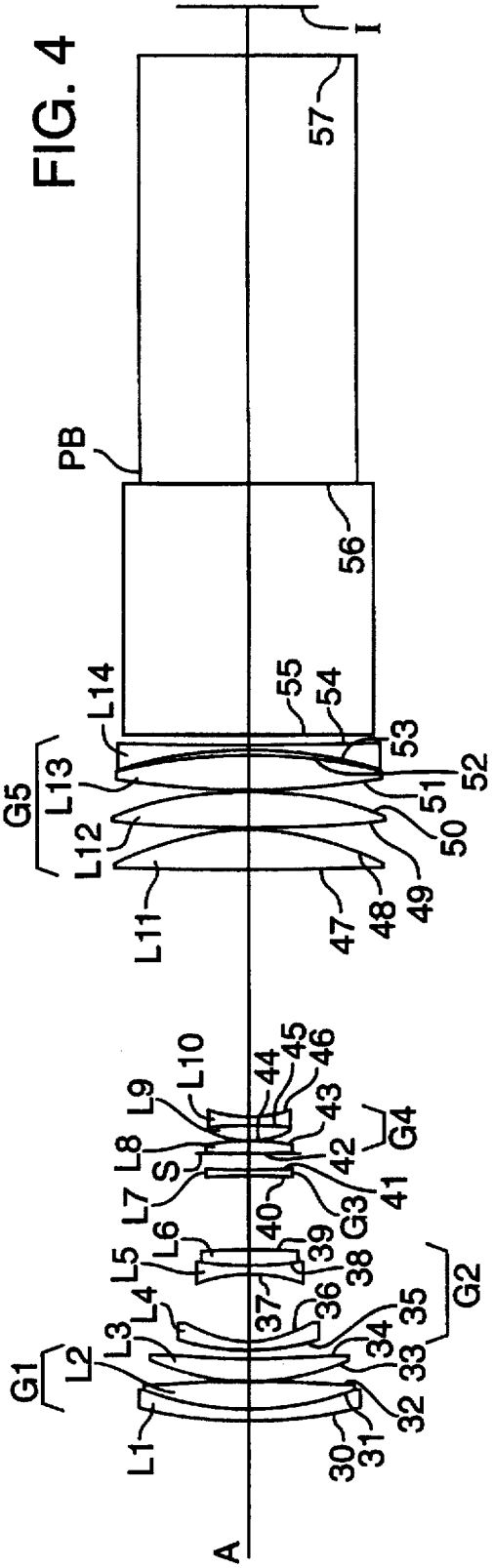
FIG. 4 is an optical diagram of Example Embodiment 2.

Example Embodiment 2, shown specifically in FIG. 4, comprises, in order from the magnifying side, a first lens group G1, a second lens group G2, a third lens group G3, a fourth lens group G4, and a fifth lens group G5. The first lens group G1 comprises a composite lens consisting of a negative meniscus lens element L1 having a convex surface 30 oriented toward the magnifying side, a biconvex lens element L2, and a positive meniscus lens element L3 having a convex surface 33 oriented toward the magnifying side. The second lens group G2 comprises a negative meniscus lens element L4 having a convex surface 35 oriented toward the magnifying side, and a composite lens consisting of a biconcave lens element L5 and a biconvex lens element L6. The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises biconvex lens elements L11, L12, and L13, and a biconcave lens element L14.

In FIG. 4, the Example Embodiment 2 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 4 also depicts a prism block PB that functions as a color-integration prism. The prism block PB is disposed on the reducing side of the fifth lens group G5. The prism block PB can be replaced with any of various other optical components performing a similar color-integrating function, such as parallel-plate filters.

Data pertaining to Example Embodiment 2 are listed in Table 2, below. In Table 2, f represents the overall focal length and Bf represents the back-focus of the zoom lens. Surface numbers progress sequentially in order from the magnifying side. Data for refractive index and Abbe's number are each indicated relative to the d-line ($\lambda$=587.6 nm).

Since a color-integrating prism block PB or any of various types of parallel plates and/or filters for color-integrating purposes can be situated between the surface 54 of the lens element L14 closest to the reducing side and the actual image plane I, numerical values for parallel surfaces 55, 56, and 57 are included in Table 2.

TABLE 2

Focal length (f) = 106 to 214 mm

| Surface No. | Curvature Radius (mm) | Interfacial Distance (mm) | Refractive Index | Abbe's Number |
|---|---|---|---|---|
| 30 | 287.387 | 4.0 | 1.6990 | 30.07 |
| 31 | 110.676 | 12.5 | 1.4875 | 70.41 |
| 32 | −459.845 | 0.2 | | |
| 33 | 89.755 | 11.0 | 1.5168 | 64.17 |
| 34 | 487.576 | d34 | | |
| 35 | 147.927 | 2.6 | 1.7130 | 53.83 |
| 36 | 50.321 | 30.0 | | |
| 37 | −71.063 | 1.8 | 1.5891 | 61.27 |
| 38 | 49.941 | 8.0 | 1.6889 | 31.18 |
| 39 | −971.484 | d39 | | |
| 40 | −128.515 | 2.0 | 1.4875 | 70.41 |
| 41 | 458.497 | d41 | | |
| 42 | 232.338 | 5.0 | 1.6477 | 33.85 |
| 43 | −120.304 | 0.2 | | |
| 44 | 33.945 | 7.0 | 1.5407 | 47.17 |
| 45 | −377.440 | 3.2 | 1.8340 | 37.34 |
| 46 | 36.901 | d46 | | |
| 47 | 2477.855 | 17.0 | 1.4565 | 90.77 |
| 48 | −122.231 | 0.2 | | |
| 49 | 413.360 | 17.0 | 1.4565 | 90.77 |
| 50 | −171.183 | 0.3 | | |
| 51 | 248.420 | 15.5 | 1.4565 | 90.77 |
| 52 | −248.420 | 1.5 | | |
| 53 | −204.221 | 4.0 | 1.7283 | 28.41 |
| 54 | 5491.288 | 5.0 | | |
| 55 | ∞ | 110.0 | 1.5168 | 64.17 |
| 56 | ∞ | 185.0 | 1.5152 | 35.29 |
| 57 | ∞ | Bf | | |

Variable distances during magnification change:

| Variable | f = 106.00 mm | f = 214.00 mm |
|---|---|---|
| d34 | 3.82 mm | 43.31 mm |
| d39 | 34.14 mm | 1.96 mm |
| d41 | 7.54 mm | 0.23 mm |
| d46 | 110.0 mm | 110.0 mm |
| Bf | 21.80 mm | 21.80 mm |

Conditional Values:

(1) D4/f45 = 0.74
(2) f4/f5 = 1.56
(3) Zm = 2
(4) |f2|/fw = 0.58
(5) D2/f2 = −0.487

Note: Object (screen) distance D0 = 10 m is the standard position.

Figure 5A:
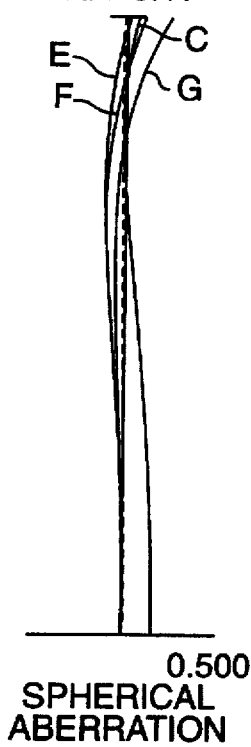
FIG. 5 shows various aberration graphs for Example Embodiment 2 at its maximum wide-angle state; specifically, FIG. 5A pertains to spherical aberration, FIG. 5B pertains to astigmatism, and FIG. 5C pertains to distortion.
Figure 5B:
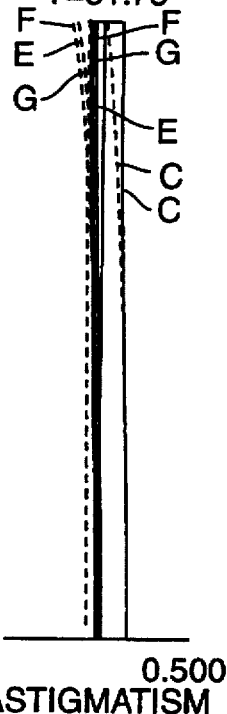
Figure 5C:
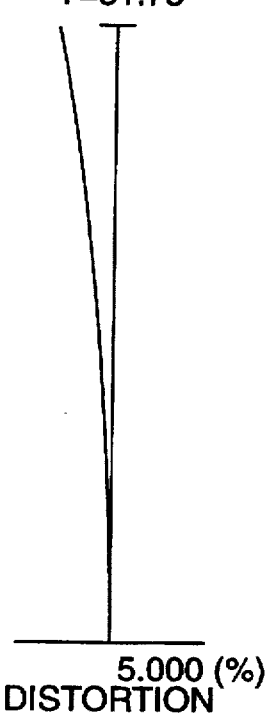
Figure 6A:
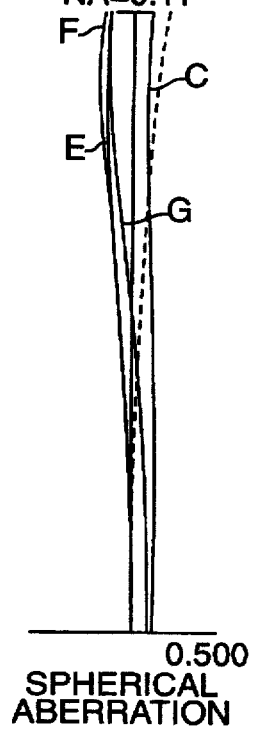
FIG. 6 shows various aberration graphs for Example Embodiment 2 at its maximum telephoto state; specifically, FIG. 6A pertains to spherical aberration, FIG. 6B pertains to astigmatism, and FIG. 6C pertains to distortion.
Figure 6B:
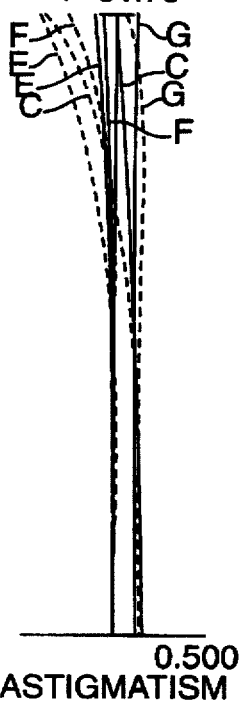
Figure 6C:
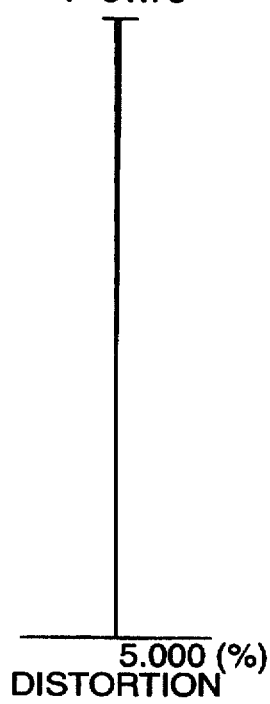

FIG. 5 and FIG. 6 present aberration graphs for Example Embodiment 2 at the maximum wide-angle state (FIG. 5) and the maximum telephoto state (FIG. 6). Specifically, FIGS. 5A and 6A are of spherical aberration, FIGS. 5B and 6B are of astigmatism, and FIGS. 5C and 6C are of distortion.

In FIGS. 5 and 6, NA is the numerical aperture number, Y is the image height, F is the F-line ($\lambda$=468.1 nm), G is the g-line ($\lambda$=435.8 nm), C is the c-line ($\lambda$=656.3 nm) and E is the e-line ($\lambda$=546.1 nm).

In addition, in FIGS. 5B and 6B, solid lines represent sagittal image surfaces and dotted lines represent meridional image surfaces. In FIGS. 5A and 6A, the dotted lines represent sine conditions.

As is clear from FIGS. 5 and 6, the various aberrations are well corrected in Example Embodiment 2, at least at the focal-length extremes of the zooming range. In this Example Embodiment, the back focus (Bf=218.34 mm; e-line) is maintained as the spatial back-focus.

Example Embodiment 3

Figure 7:
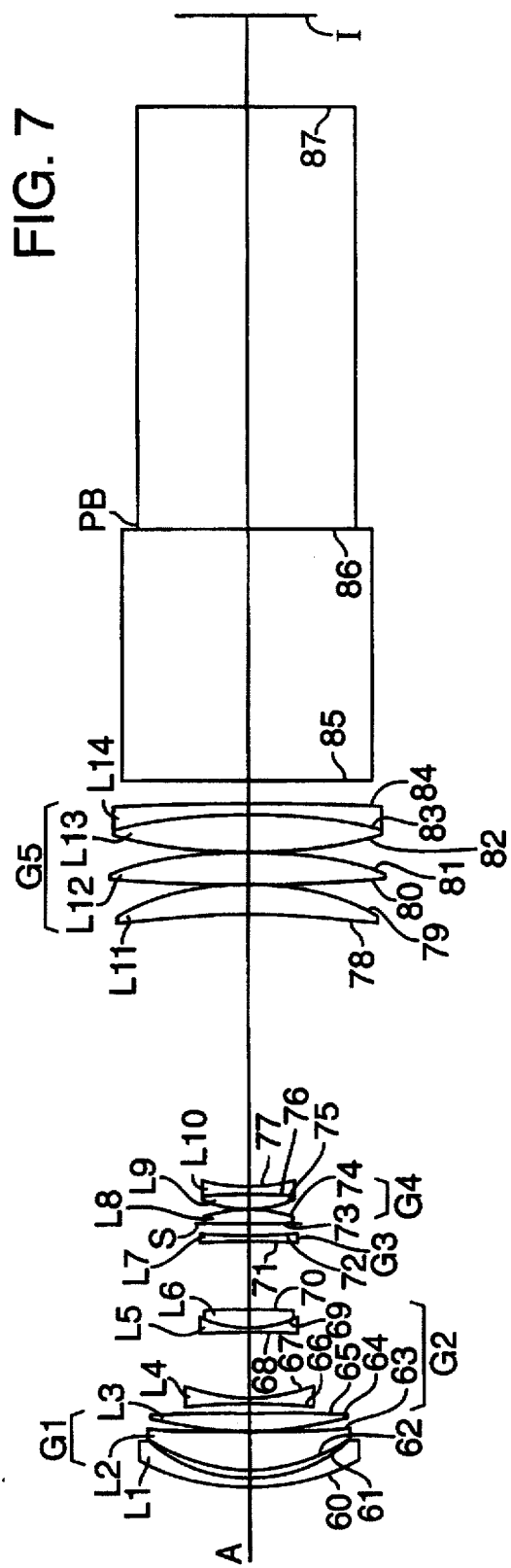
FIG. 7 is an optical diagram of Example Embodiment 3.

Example Embodiment 3, shown specifically in FIG. 7, comprises, in order from the magnifying side, a first lens group G1, a second lens group G2, a third lens group G3, a fourth lens group G4, and a fifth lens group G5. The first lens group G1 comprises a negative meniscus lens element L1 having a convex surface 60 oriented toward the magnifying side, a positive meniscus lens element L2 having a convex surface 62 oriented toward the magnifying side, and a biconvex lens element L3. The second lens group G2 comprises a biconcave lens element L4, and a composite lens consisting of a biconcave lens L5 and a positive meniscus lens element L6 having a convex surface 69 oriented toward the magnifying side. The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises a positive meniscus lens element L11 having a concave surface 78 oriented toward the magnifying side, a biconvex lens element L12, and a composite lens consisting of a biconvex lens element L13 and a negative meniscus lens element L14 having a concave surface 83 oriented toward the magnifying side.

In FIG. 7, the Example Embodiment 3 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 7 also depicts a prism block PB that functions as a color-integration prism. The prism block PB is disposed on the reducing side of the fifth lens group G5. The prism block PB can be replaced with any of various other optical components performing a similar color-integrating function, such as parallel-plate filters.

Data pertaining to Example Embodiment 3 are listed in Table 3, below. In Table 3, f represents the overall focal length and Bf represents the back-focus of the zoom lens. Surface numbers progress sequentially in order from the magnifying side. Data for refractive index and Abbe's number are each indicated relative to the d-line (λ=587.6 nm).

Since a color-integrating prism block PB or any of various types of parallel plates and/or filters for color-integrating purposes can be situated between the surface 84 of the lens element L14 closest to the reducing side and the actual image plane I, numerical values for parallel surfaces 85, 86, and 87 are included in Table 3.

TABLE 3

Focal length (f) = 106 to 214 mm

| Surface No. | Curvature Radius (mm) | Interfacial Distance (mm) | Refractive Index | Abbe's Number |
|---|---|---|---|---|
| 60 | 105.937 | 4.0 | 1.7618 | 26.53 |
| 61 | 70.583 | 3.5 | | |
| 62 | 72.245 | 16.0 | 1.4875 | 70.41 |
| 63 | 802.877 | 0.2 | | |
| 64 | 140.798 | 9.0 | 1.5891 | 61.27 |
| 65 | −1101.478 | d65 | | |
| 66 | −330.513 | 2.0 | 1.7130 | 53.83 |
| 67 | 62.940 | 30.0 | | |
| 68 | −159.981 | 1.8 | 1.5891 | 61.27 |

TABLE 3-continued

| 69 | 54.786 | 8.0 | 1.8052 | 25.43 |
|---|---|---|---|---|
| 70 | 197.638 | d70 | | |
| 71 | −147.943 | 2.0 | 1.5168 | 64.17 |
| 72 | 355.584 | d72 | | |
| 73 | 405.215 | 4.7 | 1.6200 | 36.37 |
| 74 | −76.981 | 0.2 | | |
| 75 | 45.557 | 7.0 | 1.5407 | 47.17 |
| 76 | −136.173 | 3.2 | 1.8340 | 37.34 |
| 77 | 51.080 | d77 | | |
| 78 | −416.624 | 14.0 | 1.4565 | 90.77 |
| 79 | −102.409 | 0.2 | | |
| 80 | 1197.039 | 13.0 | 1.4565 | 90.77 |
| 81 | −163.474 | 0.3 | | |
| 82 | 243.412 | 16.5 | 1.4565 | 90.77 |
| 83 | −225.276 | 4.0 | 1.7618 | 26.53 |
| 84 | −2408.505 | 10.0 | | |
| 85 | ∞ | 110.0 | 1.5168 | 64.1.7 |
| 86 | ∞ | 185.0 | 1.5152 | 35.29 |
| 87 | ∞ | Bf | | |

Variable distances during magnification change:

| Variable | f = 106.00 mm | f = 214.00 mm |
|---|---|---|
| d65 | 4.42 mm | 38.45 mm |
| d70 | 30.55 mm | 2.10 mm |
| d72 | 6.47 mm | 0.89 mm |
| d77 | 120.0 mm | 120.0 mm |
| Bf | 39.14 mm | 39.14 mm |

Conditional Values:

(1) D4/f45 = 0.77
(2) f4/f5 = 1.182
(3) Zm = 2
(4) |f2|/fw = 0.49
(5) D2/f2 = −0.574

Note: Object (screen) distance D0 = 10 m is the standard position.

Figure 8A:
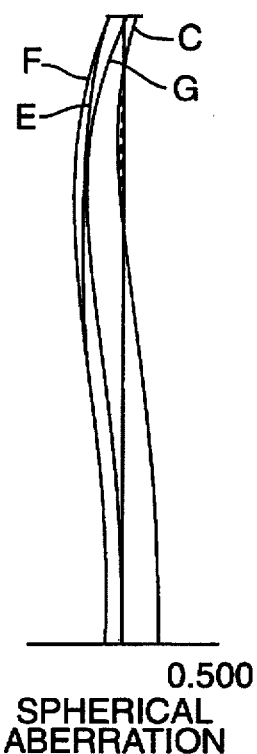
FIG. 8 shows various aberration graphs for Example Embodiment 3 at its maximum wide-angle state; specifically, FIG. 8A pertains to spherical aberration, FIG. 8B pertains to astigmatism, and FIG. 8C pertains to distortion.
Figure 8B:
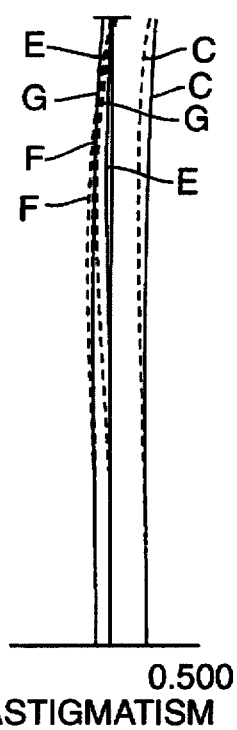
Figure 8C:
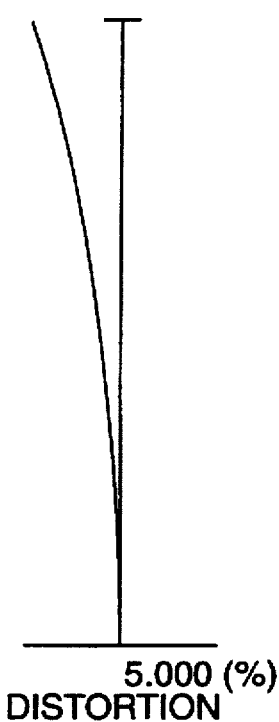
Figure 9A:
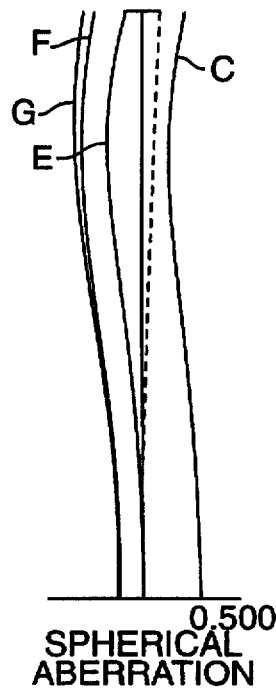
FIG. 9 shows various aberration graphs for Example Embodiment 3 at its maximum telephoto state; specifically, FIG. 9A pertains to spherical aberration, FIG. 9B pertains to astigmatism, and FIG. 9C pertains to distortion.
Figure 9B:
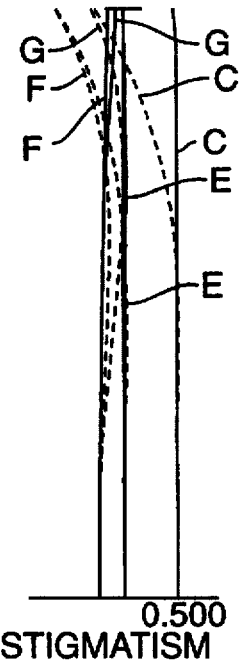
Figure 9C:
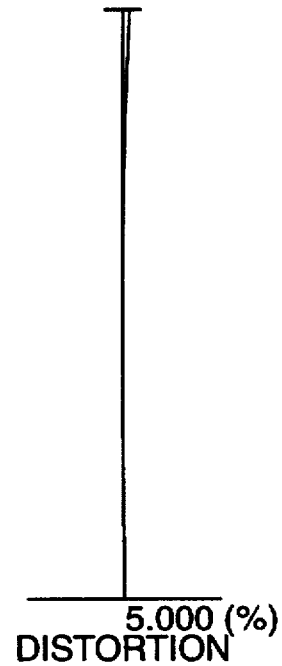

FIG. 8 and FIG. 9 present aberration graphs for Example Embodiment 3 at the maximum wide-angle state (FIG. 8) and the maximum telephoto state (FIG. 9). Specifically, FIGS. 8A and 9A are of spherical aberration, FIGS. 8B and 9B are of astigmatism, and FIGS. 8C and 9C are of distortion.

In FIGS. 8 and 9, NA is the numerical aperture number, Y is the image height, F is the F-line (λ=468.1 nm), G is the g-line (λ=435.8 nm), C is the c-line (λ=656.3 nm) and E is the e-line (λ=546.1 nm).

In addition, in FIGS. 8B and 9B, solid lines represent sagittal image surfaces and dotted lines represent meridional image surfaces. In FIGS. 8A and 9A, the dotted lines represent sine conditions.

As is clear from FIGS. 8 and 9, the various aberrations are well corrected in Example Embodiment 3, at least at the focal-length extremes of the zooming range. In this Example Embodiment, the back focus (Bf=218.34 mm; e-line) is maintained as the spatial back-focus.

Example Embodiment 4

Figure 10:
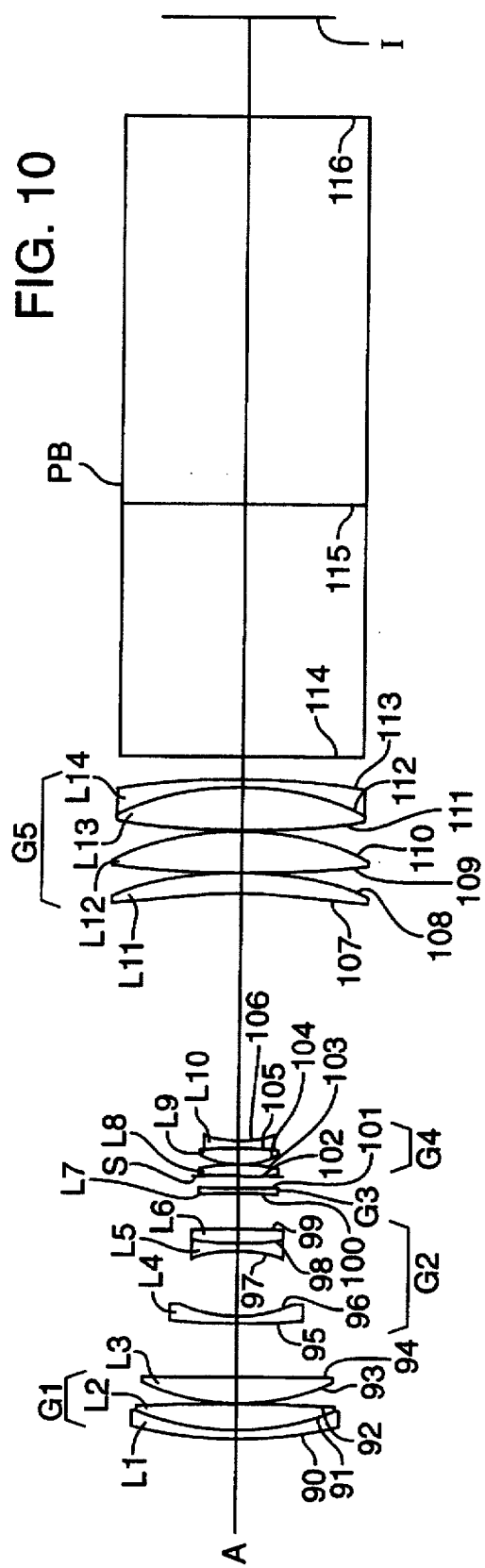
FIG. 10 is an optical diagram of Example Embodiment 4.

Example Embodiment 4, shown specifically in FIG. 10, comprises, in order from the magnifying side, a first lens group G1, a second lens group G2, a third lens group G3, a fourth lens group G4, and a fifth lens group G5. The first lens group G1 comprises a composite lens consisting of a negative meniscus lens element L1 having a convex surface 90 oriented toward the magnifying side and a biconvex lens element L2, and a positive meniscus lens element L3 having a convex surface 93 oriented toward the magnifying side. The second lens group G2 comprises a negative meniscus lens element L4 having a convex surface 95 oriented toward the magnifying side, and a composite lens consisting of a biconcave lens element L5 and a biconvex lens element L6.

The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises a positive meniscus lens element L11 having a concave surface 107 oriented toward the magnifying side, a biconvex lens element L12, and a composite lens consisting of a biconvex lens element L13 and a negative meniscus lens element L14 having a concave surface 112 oriented toward the magnifying side.

In FIG. 10, the Example Embodiment 4 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 10 also depicts a prism block PB that functions as a color-integration prism. The prism block PB is disposed on the reducing side of the fifth lens group G5. The prism block PB can be replaced with any of various other optical components performing a similar color-integrating function, such as parallel-plate filters.

Data pertaining to Example Embodiment 4 are listed in Table 4, below. In Table 4, f represents the overall focal length and Bf represents the back-focus of the zoom lens. Surface numbers progress sequentially in order from the magnifying side. Data for refractive index and Abbe's number are each indicated relative to the d-line ($\lambda$=587.6 nm).

Since a color-integrating prism block PB or any of various types of parallel plates and/or filters for color-integrating purposes can be situated between the surface 113 of the lens element L14 closest to the reducing side and the actual image plane I, numerical values for parallel surfaces 114, 115, and 116 are included in Table 4.

TABLE 4

| Focal length (f) = 106 to 214 mm | | | | |
|---|---|---|---|---|
| Surface No. | Curvature Radius (mm) | Interfacial Distance (mm) | Refractive Index | Abbe's Number |
| 90 | 202.60380 | 4.0 | 1.80518 | 25.44 |
| 91 | 114.599.00 | 12.5 | 1.51680 | 64.11 |
| 92 | −1845.34890 | 0.2 | | |
| 93 | 101.18169 | 11.0 | 1.51680 | 64.11 |
| 94 | 1191.43610 | d94 | | |
| 95 | 358.77826 | 3.0 | 1.77250 | 49.64 |
| 96 | 59.05219 | 30.0 | | |
| 97 | −76.08195 | 3.0 | 1.58913 | 61.17 |
| 93 | 83.46600 | 7.0 | 1.80518 | 25.44 |
| 99 | −16832.92300 | d99 | | |
| 100 | −139.62543 | 2.0 | 1.51680 | 64.11 |
| 101 | 4.6617719 | d101 | | |
| 102 | 215.18027 | 5.0 | 1.64769 | 33.83 |
| 103 | 110.33308 | 0.2 | | |
| 104 | 40.68994 | 7.0 | 1.54072 | 47.22 |
| 105 | −290.06000 | 3.2 | 1.80610 | 40.93 |
| 106 | 44.49188 | d106 | | |
| 107 | −336.21341 | 9.0 | 1.4970.0 | 81.60 |
| 108 | −169.84372 | 0.2 | | |
| 109 | 821.06688 | 19.0 | 1.49700 | 81.60 |
| 110 | −130.20462 | 0.3 | | |
| 111 | 372.79919 | 20.0 | 1.49700 | 81.60 |

TABLE 4-continued

| 112 | −134.73474 | 4.0 | 1.76180 | 27.10 |
|---|---|---|---|---|
| 113 | −374.52828 | 10.0 | | |
| 114 | ∞ | 110.0 | 1.51680 | 64.11 |
| 115 | ∞ | 185.0 | 1.51152 | 35.29 |
| 116 | ∞ | Bf | | |

| Variable distances during magnification change: | | |
|---|---|---|
| Variable | f = 105.990 mm | f = 213.942 mm |
| d94 | 3.425 mm | 42.937 mm |
| d99 | 40.919 mm | 2.778 mm |
| d101 | 3.303 mm | 1.933 mm |
| d106 | 113.735 mm | 113.735 mm |
| Bf | 43.315 mm | 43.315 mm |

| Conditional Values: |
|---|
| (1) D4/f45 = 0.734 |
| (2) f4/f5 = 1.245 |
| (3) Zm = 2.019 |
| (4) lf2l/fw = 0.538 |
| (5) D2/f2 = −0.526 |

Note: Object (screen) distance D0 = 10 m is the standard position.

FIG. 11 and FIG. 12 present aberration graphs for Example Embodiment 4 at the maximum wide-angle state (FIG. 11) and the maximum telephoto state (FIG. 12). Specifically, FIGS. 11A and 12A are of spherical aberration, FIGS. 11B and 12B are of astigmatism, and FIGS. 11C and 12C are of distortion.

In FIGS. 11 and 12, NA is the numerical aperture number, Y is the image height, F is the F-line ($\lambda$=468.1 nm), G is the g-line ($\lambda$=435.8 nm), C is the c-line ($\lambda$=656.3 nm) and E is the e-line ($\lambda$=546.1 nm).

In addition, in FIGS. 11B and 12B, solid lines represent sagittal image surfaces and dotted lines represent meridional image surfaces. In FIGS. 11A and 12A, the dotted lines represent sine conditions.

As is clear from FIGS. 11 and 12, the various aberrations are well corrected in Example Embodiment 4, at least at the focal-length extremes of the zooming range. In this Example Embodiment, the back focus (Bf=247.559 mm; e-line) is maintained as the spatial back-focus.

Example Embodiment 5

Example Embodiment 5, shown specifically in FIG. 13, comprises, in order from the magnifying side, a first lens group G1, a second lens group G2, a third lens group G3, a fourth lens group G4, and a fifth lens group G5. The first lens group G1 comprises a composite lens consisting of a negative meniscus lens element L1 having a convex surface 120 oriented toward the magnifying side and a biconvex lens element L2, and a positive meniscus lens element L3 having a convex surface 123 oriented toward the magnifying side. The second lens group G2 comprises a negative meniscus lens element L4 having a convex surface 125 oriented toward the magnifying side, and a composite lens consisting of a biconcave lens element L5 and a biconvex lens element L6. The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises a positive meniscus lens element L11 having a concave surface 137 oriented toward the magnifying side, a biconvex lens element L12, and a composite lens consisting of a negative meniscus lens element L13 having a convex surface 141 oriented toward the magnifying end and a biconvex lens element L14.

In FIG. 13, the Example Embodiment 5 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 13 also depicts a prism block PB that functions as a color-integration prism. The prism block PB is disposed on the reducing side of the fifth lens group G5. The prism block PB can be replaced with any of various other optical components performing a similar color-integrating function, such as parallel-plate filters.

Data pertaining to Example Embodiment 5 are listed in Table 5, below. In Table 5, f represents the overall focal length and Bf represents the back-focus of the zoom lens. Surface numbers progress sequentially in order from the magnifying side. Data for refractive index and Abbe's number are each indicated relative to the d-line ($\lambda$=587.6 nm).

Since a color-integrating prism block PB or any of various types of parallel plates and/or filters for color-integrating purposes can be situated between the surface 143 of the lens element L14 closest to the reducing side and the actual image plane I, numerical values for parallel surfaces 144, 145, and 146 are included in Table 5.

TABLE 5

Focal length (f) = 106 to 214 mm

| Surface No. | Curvature Radius (mm) | Interfacial Distance (mm) | Refractive Index | Abbe's Number |
|---|---|---|---|---|
| 120 | 202.60379 | 4.0 | 1.80518 | 25.44 |
| 121 | 114.59900 | 12.5 | 1.51680 | 64.11 |
| 122 | −1845.34390 | 0.2 | | |
| 123 | 101.18169 | 11.0 | 1.51680 | 64.11 |
| 124 | 1191.43610 | d124 | | |
| 125 | 358.77826 | 3.0 | 1.77250 | 49.64 |
| 126 | 59.05219 | 30.0 | | |
| 127 | −76.08195 | 3.0 | 1.58913 | 61.17 |
| 128 | 83.46600 | 7.0 | 1.80518 | 25.44 |
| 129 | −16332.89700 | d129 | | |
| 130 | −139.62543 | 2.0 | 1.51680 | 64.11 |
| 131 | 466.17720 | d131 | | |
| 132 | 215.18027 | 5.0 | 1.64769 | 33.83 |
| 133 | −110.33308 | 0.2 | | |
| 134 | 40.68994 | 7.0 | 1.54072 | 47.22 |
| 135 | −290.06000 | 3.2 | 1.80610 | 40.93 |
| 136 | 44.49188 | d136 | | |
| 137 | −297.78101 | 10.0 | 1.49700 | 81.60 |
| 138 | −158.05425 | 0.2 | | |
| 139 | 388.02374 | 15.5 | 1.49700 | 81.60 |
| 140 | −191.90229 | 0.3 | | |
| 141 | 328.06121 | 4.0 | 1.74000 | 28.26 |
| 142 | 122.20393 | 24.0 | 1.49700 | 81.60 |
| 143 | −282.90605 | 10.0 | | |
| 144 | ∞ | 110.0 | 1.51680 | 64.11 |
| 145 | ∞ | 185.0 | 1.5152 | 35.29 |
| 146 | ∞ | Bf | | |

Variable distances during magnification change:

| Variable | f = 105.990 mm | f = 213.942 mm |
|---|---|---|
| d124 | 3.425 mm | 42.937 mm |
| d129 | 40.919 mm | 2.778 mm |
| d131 | 3.303 mm | 1.933 mm |
| B136 | 112.320 mm | 112.32.0 mm |
| Bf | 43.291 mm | 43.291 mm |

TABLE 5-continued

Conditional Values:

(1) D4/f45 = 0.725
(2) f4/f5 = 1.245
(3) Zm = 2.019
(4) |f2|/fw = 0.538
(5) D2/f2 = −0.526

Note: Object (screen) distance D0 = 10 m is the standard position.

Figure 14A:
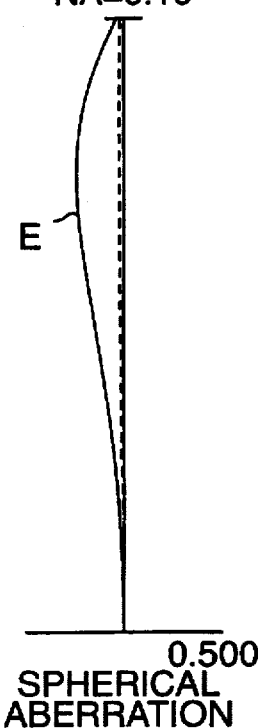
FIG. 14 shows various aberration graphs for Example Embodiment 5 at its maximum wide-angle state; specifically, FIG. 14A pertains to spherical aberration, FIG. 14B pertains to astigmatism, and FIG. 14C pertains to distortion.
Figure 14B:
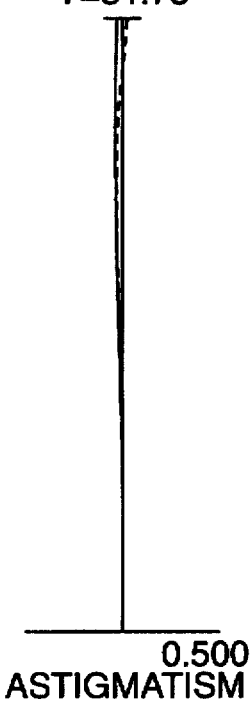
Figure 14C:
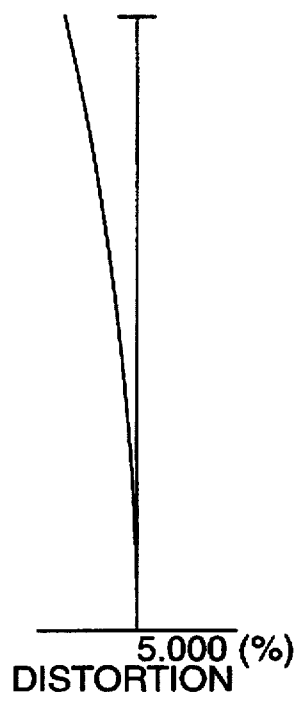
Figure 15A:
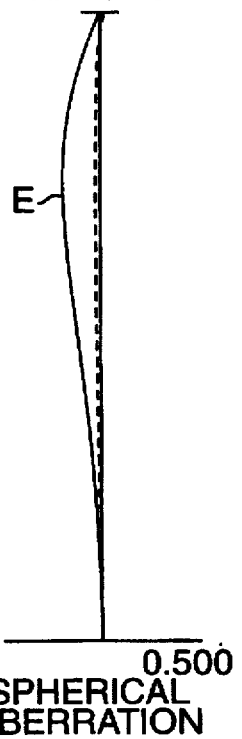
FIG. 15 shows various aberration graphs for Example Embodiment 5 at its maximum telephoto state; specifically, FIG. 15A pertains to spherical aberration, FIG. 15B pertains to astigmatism, and FIG. 15C pertains to distortion.
Figure 15B:
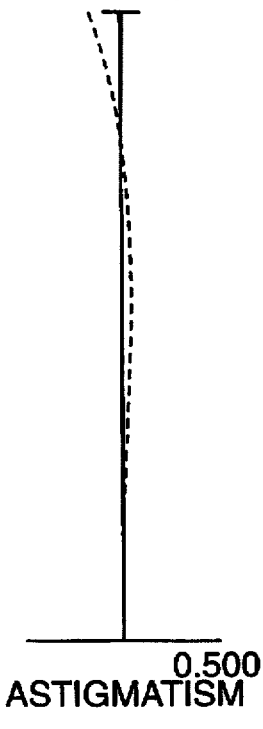
Figure 15C:
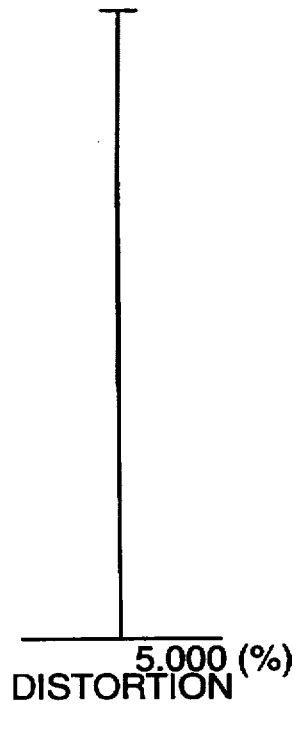

FIG. 14 and FIG. 15 present aberration graphs for Example Embodiment 5 at the maximum wide-angle state (FIG. 14) and the maximum telephoto state (FIG. 15). Specifically, FIGS. 14A and 15A are of spherical aberration, FIGS. 14B and 15B are of astigmatism, and FIGS. 14C and 15C are of distortion.

In FIGS. 14 and 15, NA is the numerical aperture number, Y is the image height, F is the F-line ($\lambda$=468.1 nm), G is the g-line ($\lambda$=435.8 nm), C is the c-line ($\lambda$=656.3 nm) and E is the e-line ($\lambda$=546.1 nm).

In addition, in FIGS. 14B and 15B, solid lines represent sagittal image surfaces and dotted lines represent meridional image surfaces. In FIGS. 14A and 15A, the dotted lines represent sine conditions.

As is clear from FIGS. 14 and 15, the various aberrations are well corrected in Example Embodiment 5, at least at the focal-length extremes of the zooming range. In this Example Embodiment, the back focus (Bf=247.535 mm; e-line) is maintained as the spatial back-focus.

Example Embodiment 6

Figure 16:
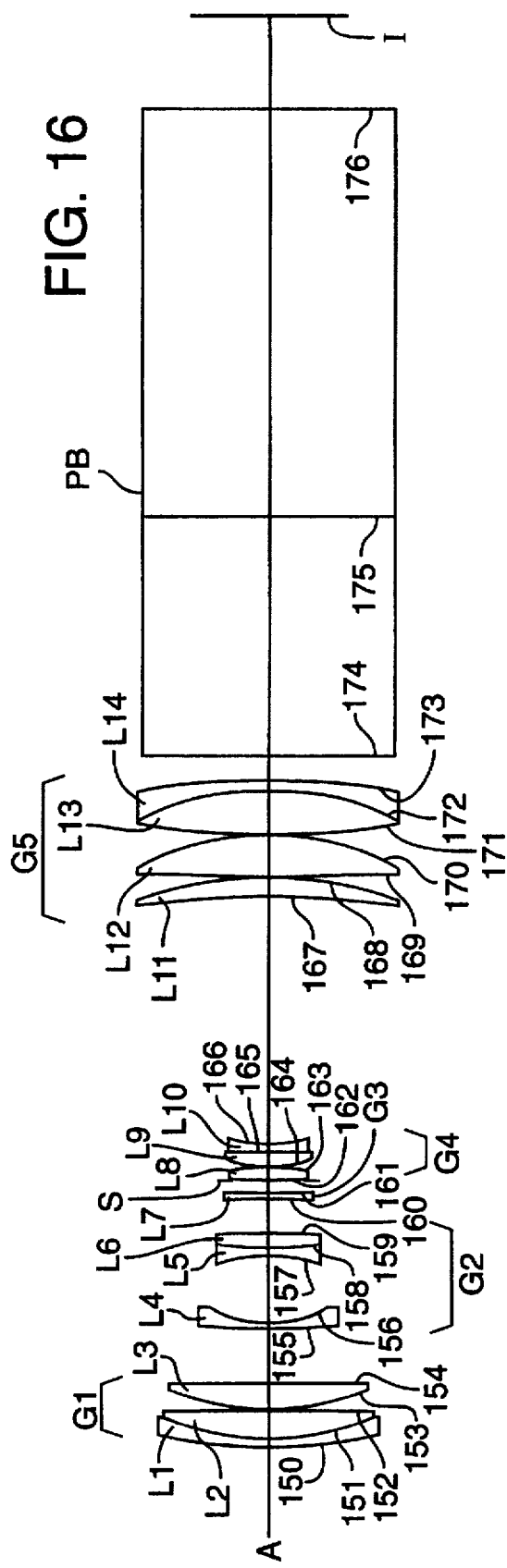
FIG. 16 is an optical diagram of Example Embodiment 6.

Example Embodiment 6, shown specifically in FIG. 16, comprises, in order from the magnifying side, a first lens group G1, a second lens group G2, a third lens group G3, a fourth lens group G4, and a fifth lens group G5. The first lens group G1 comprises a composite lens consisting of a negative meniscus lens element L1 having a convex surface 150 oriented toward the magnifying side and a biconvex lens element L2, and a positive meniscus lens element L3 having a convex surface 153 oriented toward the magnifying side. The second lens group G2 comprises a negative meniscus lens element L4 having a convex surface 155 oriented toward the magnifying side, and a composite lens consisting of a biconcave lens element L5 and a biconvex lens element L6. The third lens group G3 comprises a biconcave lens element L7. The fourth lens group G4 comprises a biconvex lens element L8, and a composite lens consisting of a biconvex lens element L9 and a biconcave lens element L10. The fifth lens group G5 comprises a positive meniscus lens element L11 having a concave surface 167 oriented toward the magnifying side, a biconvex lens element L12, and a composite lens consisting of a biconvex lens element L13 and a negative meniscus lens element L14 having a concave surface 172 oriented toward the magnifying end.

In FIG. 16, the Example Embodiment 6 is shown at its maximum wide-angle state. During zooming toward the maximum telephoto state, the second lens group G2 moves in a linear fashion along the optical axis toward the reducing side while the third lens group G3 moves along a convex path toward the magnifying side. The first lens group G1, the fourth lens group G4, and the fifth lens group G5 remain stationary on the optical axis during zooming.

An open aperture S is disposed at the compound focal position, on the magnifying side, of the fourth and fifth lens groups. The aperture S remains stationary on the optical axis during zooming.

FIG. 16 also depicts a prism block PB that functions as a color-integration prism. The prism block PB is disposed on the reducing side of the fifth lens group G5. The prism block PB can be replaced with any of various other optical components performing a similar color-integrating function to a prism block, such as parallel-plate filters.

Data pertaining to Example Embodiment 6 are listed in Table 6, below. In Table 6, f represents the overall focal length and Bf represents the back-focus of the zoom lens. Surface numbers progress sequentially in order from the magnifying side. Data for refractive index and Abbe's number are each indicated relative to the d-line ($\lambda=587.6$ nm).

Since a color-integrating prism block PB or any of various types of parallel plates and/or filters for color-integrating purposes can be situated between the surface 173 of the lens element L14 closest to the reducing side and the actual image plane I, numerical values for parallel surfaces 174, 175, and 176 are included in Table 6.

TABLE 6

Focal length (f) = 106 to 214 mm

| Surface No. | Curvature Radius (mm) | Interfacial Distance (mm) | Refractive Index | Abbe's Number |
|---|---|---|---|---|
| 150 | 202.60379 | 4.0 | 1.80518 | 25.44 |
| 151 | 114.59900 | 12.5 | 1.51680 | 64.11 |
| 152 | −1845.34890 | 0.2 | | |
| 153 | 101.18169 | 11.0 | 1.51680 | 64.11 |
| 15A | 1191.43590 | d154 | | |
| 155 | 358.77826 | 3.0 | 1.77250 | 49.64 |
| 156 | 59.05219 | 30.0 | | |
| 157 | −76.08195 | 3.0 | 1.58913 | 61.17 |
| 158 | 83.46600 | 7.0 | 1.80518 | 25.44 |
| 159 | −16832.97600 | d159 | | |
| 160 | −139.62543 | 2.0 | 1.51680 | 64.11 |
| 161 | 466.17719 | d161 | | |
| 162 | 215.18027 | 5.0 | 1.64769 | 33.83 |
| 163 | −110.33308 | 0.2 | | |
| 164 | 40.68994 | 7.0 | 1.54072 | 47.22 |
| 165 | −290.06000 | 3.2 | 1.80610 | 40.93 |
| 166 | 44.49188 | d166 | | |
| 167 | −338.43400 | 9.0 | 1.49700 | 81.60 |
| 168 | −170.36072 | 0.2 | | |
| 169 | 834.58149 | 19.0 | 1.49700 | 81.60 |
| 170 | −130.04115 | 0.3 | | |
| 171 | 369.17711 | 20.0 | 1.49700 | 81.60 |
| 172 | −135.009.00 | 4.0 | 1.76182 | 26.56 |
| 173 | −376.6744.0 | 10.0 | | |
| 174 | ∞ | 110.0 | 1.51680 | 64.11 |
| 175 | ∞ | 185.0 | 1.5152 | 35.29 |
| 176 | ∞ | Bf | | |

Variable distances during magnification change:

| Variable | f = 105.955 mm | f = 213.873 mm |
|---|---|---|
| d154 | 3.425 mm | 42.937 mm |
| d159 | 40.919 mm | 2.778 mm |
| d161 | 3.303 mm | 1.933 mm |
| d166 | 113.746 mm | 113.746 mm |
| Bf | 43.220 mm | 43.220 mm |

Conditional Values:

(1) D4/f45 = 0.734
(2) f4/f5 = 1.245
(3) Zm = 2.019
(4) |f2|/fw = 0.538
(5) D2/f2 = −0.526

Note: Object (screen) distance D0 = 10 m is the standard position.

Figure 17A:
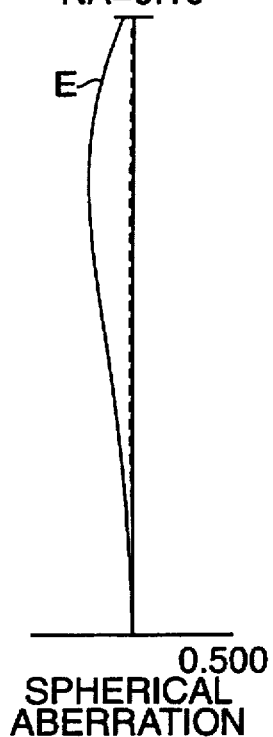
FIG. 17 shows various aberration graphs for Example Embodiment 6 at its maximum wide-angle state; specifically, FIG. 17A pertains to spherical aberration, FIG. 17B pertains to astigmatism, and FIG. 17C pertains to distortion.
Figure 17B:
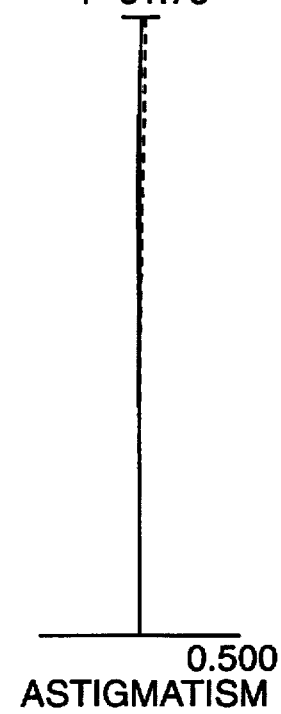
Figure 17C:
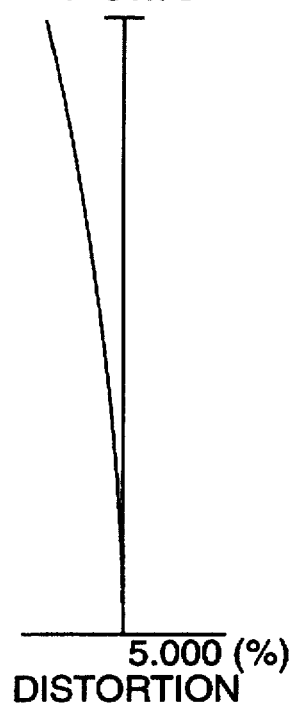
Figure 18A:
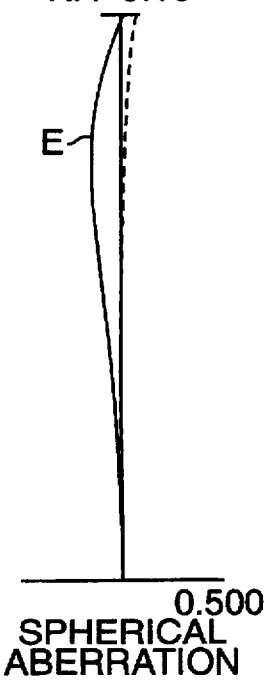
FIG. 18 shows various aberration graphs for Example Embodiment 6 at its maximum telephoto state; specifically, FIG. 18A pertains to spherical aberration, FIG. 18B pertains to astigmatism, and FIG. 18C pertains to distortion.
Figure 18B:
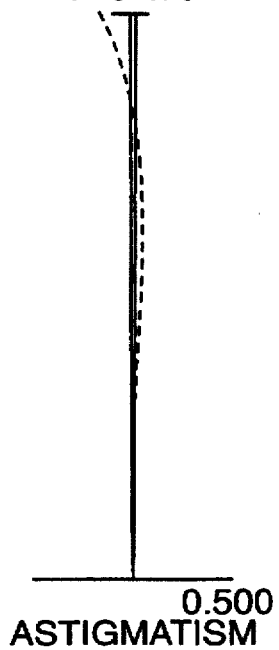
Figure 18C:
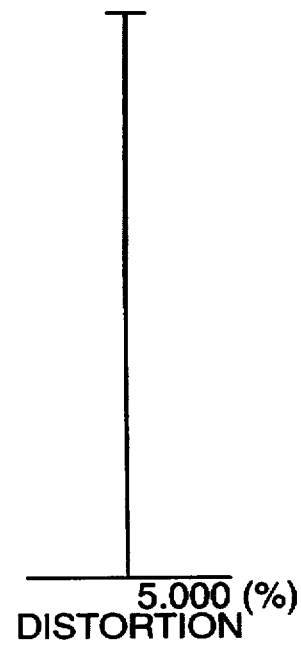

FIG. 17 and FIG. 18 present aberration graphs for Example Embodiment 6 at the maximum wide-angle state (FIG. 17) and the maximum telephoto state (FIG. 18). Specifically, FIGS. 17A and 18A are of spherical aberration, FIGS. 17B and 18B are of astigmatism, and FIGS. 17C and 18C are of distortion.

In FIGS. 17 and 18, NA is the numerical aperture number, Y is the image height, F is the F-line ($\lambda=468.1$ nm), G is the g-line ($\lambda=435.8$ nm), C is the c-line ($\lambda=656.3$ nm) and E is the e-line ($\lambda=546.1$ nm).

In addition, in FIGS. 17B and 18B, solid lines represent sagittal image surfaces and dotted lines represent meridional image surfaces. In FIGS. 17A and 18A, the dotted lines represent sine conditions.

As is clear from FIGS. 17 and 18, the various aberrations are well corrected in Example Embodiment 6, at least at the focal-length extremes of the zooming range. In this Example Embodiment, the back focus (Bf=247.464 mm; e-line) is maintained as the spatial back-focus.

By means of the embodiments of this invention as described above, it is possible to realize a telecentric zoom lens for projection purposes (especially involving simultaneous projection of R, G, and B CRT or LCD images on a screen). The focal length of the lens is variable over a desired range which provides a long back-focus and excellent telecentricity.

The aforementioned embodiments are intended, at most, to clarify the technical content of this invention. It will be appreciated by persons of ordinary skill in the art that this invention can be variously modified within the intent of this invention and the scope described in the claims, without being narrowly interpreted so as to be limited to the aforementioned embodiments.

What is claimed is:

1. A zoom lens, comprising:

(a) in order from the magnifying side to the reducing side on an optical axis, first, second, third, fourth, and fifth lens groups having a positive, negative, negative, positive, and positive focal length, respectively;

(b) the zoom lens being operable to zoom over a zoom range from a maximum wide-angle state to a maximum telephoto state, during which zooming the second lens group moves on the optical axis linearly toward the reducing side and the third lens group moves on the optical axis toward the magnifying side along a convex path being convex toward the magnifying side; and (c) the fourth and fifth lens groups being telecentric on the reducing side across the entire zoom range of the zoom lens, the fourth lens group having a focal length f4, the fifth lens group having a focal length f5, the fourth and fifth lens groups having a composite focal length f45 and being separated from each other by an axial space having a length D4, the zoom lens satisfying conditions as follows:

$$0.5 < D4/f45 < 1.0$$

$$1.0 < f4/f5 < 1.7.$$

2. The zoom lens of claim 1 having a zoom ratio Zm, the zoom lens further satisfying the condition:

$$1.5 < Zm.$$

3. The zoom lens of claim 1, wherein the second lens group has a focal length f2 and the zoom lens has an overall focal length fw at the wide-angle state, the zoom lens further satisfying the condition:

$$0.4 < |f2|/fw < 0.7.$$

4. The zoom lens of claim 1, wherein the second lens group comprises, in order from the magnifying side, a front lens subgroup and a rear lens subgroup, the front lens subgroup comprising a lens element having a concave surface oriented toward the reducing side, and the rear lens subgroup comprising a lens element having a concave surface oriented toward the magnifying side.

5. The zoom lens of claim 4 wherein the front and rear lens subgroups are separated from one another by a space having an axial length D2, and the second lens group has a focal length f2, the zoom lens further satisfying the condition:

$-1<D2/f2<-0.2$.

6. The zoom lens of claim 1, wherein the fourth lens group comprises a lens element disposed as the closest lens element in the fourth lens group to the reducing side, the lens element having a concave surface oriented toward the reducing side.

7. The zoom lens of claim 1, wherein the fifth lens group comprises a lens element disposed as the closest lens element in the fifth lens group to the magnifying side, the lens element having a concave surface oriented toward the magnifying side.

8. The zoom lens of claim 1, further comprising an open aperture disposed at the magnifying-side focal position of the combined fourth and fifth lens groups.

9. An optical system, comprising the zoom lens of claim 1 and a color-integrating optical element axially disposed on the reducing side of the fifth lens group.

10. A system for projecting an image for viewing, comprising:

(a) the zoom lens system of claim 9;

(b) an image source disposed on the reducing side of the zoom lens; and (c) a viewing screen disposed on the magnification side of the zoom lens.

11. A zoom lens, comprising:

(a) in order from the magnifying side to the reducing side on an optical axis, first, second, third, fourth, and fifth lens groups having a positive, negative, negative, positive, and positive focal length, respectively, the fourth and fifth lens groups having a composite focal length f45 and being separated from each other by a space having an axial length D4;

(b) the zoom lens being operable to zoom over a zoom range from a maximum wide-angle state to a maximum telephoto state, during which zooming the second lens group moves on the optical axis linearly toward the reducing side and the third lens group moves on the optical axis toward the magnifying side along a convex path being convex toward the magnifying side;

(c) the fourth and fifth lens groups having respective focal lengths f4 and f5 and being telecentric on the reducing side across the entire zoom range of the zoom lens;

(d) the zoom lens satisfying the conditions:

$0.5<D4/f45<10$ $1.0<f4/f5<1.7$; and (e) an open aperture disposed axially between the third and fourth lens groups.

12. The zoom lens of claim 11 having a zoom ratio Zm and further satisfying the condition:

$1.5<Zm$.

13. The zoom lens of claim 11, wherein the second lens group has a focal length f2, the zoom lens having an overall focal length fw at the maximum wide-angle state and further satisfying the condition:

$0.4<|f2|/fw<0.7$.

14. The zoom lens of claim 11, wherein the second lens group has a focal length f2 and comprises, in order from the magnifying side, a front lens subgroup and a rear lens subgroup separated from the front lens subgroup by an axial distance D2, the zoom lens satisfying the condition:

$-1<D2/f2<-0.2$.

15. The zoom lens of claim 11, wherein the second lens group comprises, in order from the magnifying side, a front lens subgroup and a rear lens subgroup, the front lens subgroup comprising a lens element disposed as the closest lens element in the front lens subgroup to the reducing side, the lens element in the front lens subgroup having a concave surface oriented toward reducing side, and the rear lens subgroup comprising a lens element disposed as the closest lens element in the rear lens subgroup to the magnifying side, the lens element in the rear lens subgroup having a concave surface oriented toward the magnifying side.

16. The zoom lens of claim 11, wherein the fourth lens group comprises a lens element disposed as the closest lens element in the fourth lens group to the reducing side, the lens element having a concave surface oriented toward the reducing side.

17. The zoom lens of claim 11, wherein the fifth lens group comprises a lens element disposed as the closest lens element in the fifth lens group to the magnifying side, the lens element having a concave surface oriented toward the magnifying side.

18. An optical system, comprising the zoom lens of claim 11 and a color-integrating optical element axially disposed on the reducing side of the fifth lens group.

19. A system for projecting an image for viewing, comprising:

(a) the zoom lens system of claim 18;

(b) an image source disposed on the reducing side of the zoom lens; and (c) a viewing screen disposed on the magnification side of the zoom lens.

20. A zoom lens, comprising in order from a magnifying side to a reducing side on an optical axis:

(a) first, second, and third lens groups having a positive, negative, and negative focal length, respectively; an open aperture; and fourth and fifth lens groups each having a positive focal length, the second lens group having a focal length f2, and the zoom lens having an overall focal length fw at the wide-angle state, the zoom lens further satisfying the condition:

$0.4<|f2|/fw<0.7$;

(b) the zoom lens being operable to zoom over a zoom range from a maximum wide-angle state to a maximum telephoto state, during which zooming the second lens group moves on the optical axis linearly toward the reducing side and the third lens group moves on the optical axis toward the magnifying side along a convex path being convex toward the magnifying side, while the first, fourth, and fifth lens groups remain stationary on the optical axis; and (c) the open aperture being disposed at a magnifying-side focal position of the combined fourth and fifth lens groups.

21. An optical system, comprising the zoom lens of claim 20 and a color-integrating optical element axially disposed on the reducing side of the fifth lens group.

22. A system for projecting an image for viewing, comprising:

(a) the zoom lens system of claim 21;

(b) an image source disposed on the reducing side of the zoom lens; and (c) a viewing screen disposed on the magnification side of the zoom lens.

* * * * *

UNITED STATES PATENT AND TRADEMARK OFFICE
CERTIFICATE OF CORRECTION

PATENT NO. : 5,764,419

DATED : June 9, 1998

INVENTOR(S) : Naoko Kodama and Masayuki Aoki

It is certified that error appears in the above-identified patent and that said Letters Patent is hereby corrected as shown below:

On the Cover Page:

"*Primary Examiner*—Daivd C. Nelms" should be --*Primary Examiner*—David C. Nelms--.

In the Specification:

Column 6, line 29, Table 1, under the column labeled "Abbe's Number" for Surface No. 13, "33.&3" should be --33.83--.

Column 8, line 11, Table 2, under the column labeled "Curvature Radius (mm)" for Surface No. 34, "487. 576" should be --487.576--.

Column 10, line 13, Table 3, under the column labeled "Curvature Radius (mm)" for Surface No. 81, "-163.474" should be -- -183.474 --.

Column 10, line 17, Table 3, under the column labeled "Abbe's Number" for Surface No. 85 (specification page 20, line 33), "64.1.7" should be --64.17--.

UNITED STATES PATENT AND TRADEMARK OFFICE
CERTIFICATE OF CORRECTION

PATENT NO.  : 5,764,419

DATED       : June 9, 1998

INVENTOR(S) :  Naoko Kodama and Masayuki Aoki

It is certified that error appears in the above-identified patent and that said Letters Patent is hereby corrected as shown below:

Column 11, line 50, Table 4, under the column labeled "Curvature Radius (mm)" for Surface No. 91, "114.599.00" should be --114.59900--.

Column 11, line 58, Table 4, under the column labeled "Curvature Radius (mm)" for Surface No. 101, "4.6617719" should be --466.17719--.

Column 11, line 60, Table 4, under the column labeled "Curvature Radius (mm)" for Surface No. 103, "110.33308" should be -- -110.33308 --.

Column 11, line 62, Table 4, under the column labeled "Refractive Index" for Surface No. 107, "1.4970.0" should be --1.49700--.

Column 11, line 63, Table 4, under the column labeled "Curvature Radius (mm)" for Surface No. 108, "-169.84372" should be -- -169.84872 --.

Column 13, line 37, Table 5, under the column labeled "Curvature Radius (mm)" for Surface No. 122, "-1845.34390" should be -- -1845.34890 --.

Column 13, line 44, Table 5, under the column labeled "Curvature Radius (mm)" for Surface No. 129, "-16332.89700" should be -- -16832.89700 --.

Column 13, line 50, Table 5, under the column labeled "Curvature Radius (mm)" for Surface No. 137, "-297.78i01" should be -- -297.78101 --.

Column 13, line 64, Table 5, in the fourth row of the third column, "112.32.0 mm" should be --112.320 mm--.

UNITED STATES PATENT AND TRADEMARK OFFICE
CERTIFICATE OF CORRECTION

PATENT NO. : 5,764,419

DATED : June 9, 1998

INVENTOR(S) : Naoko Kodama and Masayuki Aoki

It is certified that error appears in the above-identified patent and that said Letters Patent is hereby corrected as shown below:

Column 15, line 41, Table 6, under the column labeled "Curvature Radius (mm)" for Surface No. 172, "-135.009.00" should be -- -135.00900 --.

Column 15, line 42, Table 6, under the column labeled "Curvature Radius (mm)" for Surface No. 173, "-376.6744.0" should be -- -376.67440 --.

<u>In the Claims:</u>

Column 17, line 56, "$0.5 < D4/f45 < 10$" should be --$0.5 < D4/f45 < 1.0$--.

Signed and Sealed this

Twenty-first Day of September, 1999

Q. TODD DICKINSON

Attest:

*Attesting Officer*      *Acting Commissioner of Patents and Trademarks*